United States Patent
Ghatti et al.

(10) Patent No.: US 11,002,352 B2
(45) Date of Patent: May 11, 2021

(54) AXLE ASSEMBLY HAVING AN AXLE HOUSING

(71) Applicant: ArvinMeritor Technology, LLC, Troy, MI (US)

(72) Inventors: Chetankumar Ghatti, Troy, MI (US); Rodrigo Soffner, Osasco (BR)

(73) Assignee: ArvinMeritor Technology, LLC, Troy, MI (US)

( * ) Notice: Subject to any disclaimer, the term of this patent is extended or adjusted under 35 U.S.C. 154(b) by 48 days.

(21) Appl. No.: 16/594,795

(22) Filed: Oct. 7, 2019

(65) Prior Publication Data

US 2021/0102610 A1  Apr. 8, 2021

(51) Int. Cl.
| | |
|---|---|
| *B60K 1/00* | (2006.01) |
| *F16H 37/08* | (2006.01) |
| *F16H 57/021* | (2012.01) |
| *F16H 57/04* | (2010.01) |
| *F16H 3/093* | (2006.01) |
| *F16H 37/04* | (2006.01) |
| *F16H 48/08* | (2006.01) |
| *F16H 57/023* | (2012.01) |
| *F16H 57/037* | (2012.01) |
| *F16H 3/091* | (2006.01) |
| *F16H 57/02* | (2012.01) |

(52) U.S. Cl.
CPC .......... *F16H 37/0813* (2013.01); *B60K 1/00* (2013.01); *F16H 3/091* (2013.01); *F16H 3/093* (2013.01); *F16H 37/04* (2013.01); *F16H 48/08* (2013.01); *F16H 57/021* (2013.01); *F16H 57/023* (2013.01); *F16H 57/037* (2013.01); *F16H 57/0423* (2013.01); *B60K 2001/001* (2013.01); *F16H 2003/0933* (2013.01); *F16H 2057/0216* (2013.01); *F16H 2057/02052* (2013.01); *F16H 2200/00* (2013.01); *F16H 2702/04* (2013.01)

(58) Field of Classification Search
None
See application file for complete search history.

(56) References Cited

U.S. PATENT DOCUMENTS

| | | | | |
|---|---|---|---|---|
| 5,623,851 | A * | 4/1997 | Ooyama | F16H 3/089 74/333 |
| 6,935,451 | B2 * | 8/2005 | Bell | B60K 6/38 180/65.25 |
| 8,491,432 | B2 * | 7/2013 | Radermacher | B60K 6/48 475/5 |

(Continued)

FOREIGN PATENT DOCUMENTS

EP  3 501 867 A1  6/2019

OTHER PUBLICATIONS

Dhanapal, et al., U.S. Appl. No. 16/205,586, filed with the United States Patent and Trademark Office on Nov. 30, 2018.

(Continued)

*Primary Examiner* — Dirk Wright
(74) *Attorney, Agent, or Firm* — Brooks Kushman PC

(57) ABSTRACT

An axle assembly having an axle housing, an electric motor module, and a countershaft transmission module. The axle housing may have a first mounting flange and a second mounting flange. The electric motor module may be mounted to the first mounting flange. The countershaft transmission module may be mounted to the second mounting flange.

20 Claims, 6 Drawing Sheets

(56) References Cited

U.S. PATENT DOCUMENTS

| | | | |
|---|---|---|---|
| 9,719,584 B1* | 8/2017 | Duan | F16H 37/0813 |
| 10,189,351 B2* | 1/2019 | Liu | B60G 21/026 |
| 2018/0297401 A1* | 10/2018 | Liu | B60T 8/32 |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0189375 A1* | 6/2020 | Hayashi | B60K 1/00 |

OTHER PUBLICATIONS

Smith, et al., U.S. Appl. No. 16/205,623, filed with the United States Patent and Trademark Office on Nov. 30, 2018.
Smith, et al., U.S. Appl. No. 16/206,182, filed with the United States Patent and Trademark Office on Nov. 30, 2018.
Soffner, et al., U.S. Appl. No. 16/205,663, filed with the United States Patent and Trademark Office on Nov. 30, 2018.
Begov et al., U.S. Appl. No. 16/205,717, filed with the United States Patent and Trademark Office on Nov. 30, 2018.
Smith, et al., U.S. Appl. No. 16/205,771, filed with the United States Patent and Trademark Office on Nov. 30, 2018.
Peng, et al., U.S. Appl. No. 16/205,850, filed with the United States Patent and Trademark Office on Nov. 30, 2018.
Extended European Search Report dated Mar. 3, 2021, for related European Appln. No. 20197348.4; 13 pages.

\* cited by examiner

US 11,002,352 B2

AXLE ASSEMBLY HAVING AN AXLE HOUSING

TECHNICAL FIELD

This disclosure relates to an axle assembly having an axle housing that may receive a drop gear set and that may facilitate mounting of an electric motor module and a countershaft transmission module.

BACKGROUND

An axle assembly having an electric motor module is disclosed in U.S. Patent Publication No. 2019/0054816.

SUMMARY

In at least one embodiment, an axle assembly is provided. The axle assembly may include an axle housing, an electric motor module, and a countershaft transmission module. The axle housing may include a drop gear housing portion, a center portion, and an arm portion. The drop gear housing portion may define a first mounting flange. The center portion may extend from the drop gear housing portion and may define a second mounting flange. The arm portion may extend from the center portion and may be configured to receive an axle shaft. The electric motor module may be mounted to the first mounting flange. The countershaft transmission module may be mounted to the second mounting flange.

In at least one embodiment, an axle assembly is provided. The axle assembly may include an axle housing, an electric motor module, a first countershaft, a countershaft transmission module, a drop gear set, and a drive pinion. The axle housing may at least partially receive a differential assembly. The axle housing may have a first mounting flange and a second mounting flange that is disposed opposite the first mounting flange. The electric motor module may be mounted to the first mounting flange and may have a rotor that is rotatable about a first axis. The countershaft transmission module may be mounted to the second mounting flange. The countershaft transmission module may include a countershaft subassembly and a set of countershaft gears. The countershaft subassembly may be at least partially received in the axle housing and may be rotatable about a countershaft axis. The set of countershaft gears may be operatively connectable to the countershaft subassembly. The drop gear set may be received in the axle housing and may operatively connect the rotor to the countershaft subassembly. The drive pinion may operatively connect the countershaft transmission to the differential assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
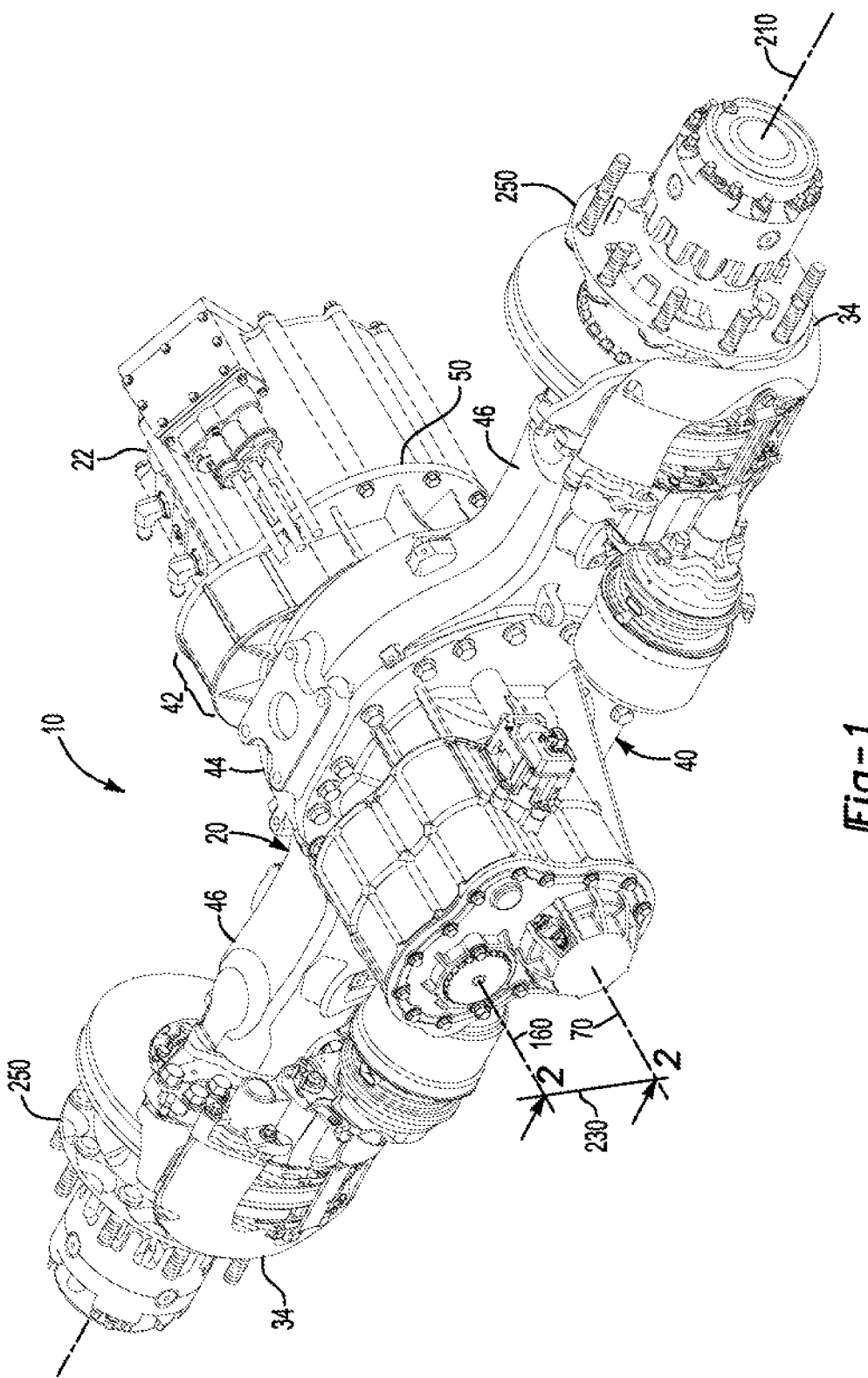
FIG. 1 is a perspective view of an example of an axle assembly.

Referring to FIG. 1, an example of an axle assembly 10 is shown. The axle assembly 10 may be provided with a motor vehicle like a car, truck, bus, farm equipment, mining equipment, military transport or weaponry vehicle, or cargo loading equipment for land, air, or marine vessels. The motor vehicle may include a trailer for transporting cargo in one or more embodiments. One or more axle assemblies may be provided with the vehicle.

Figure 2:
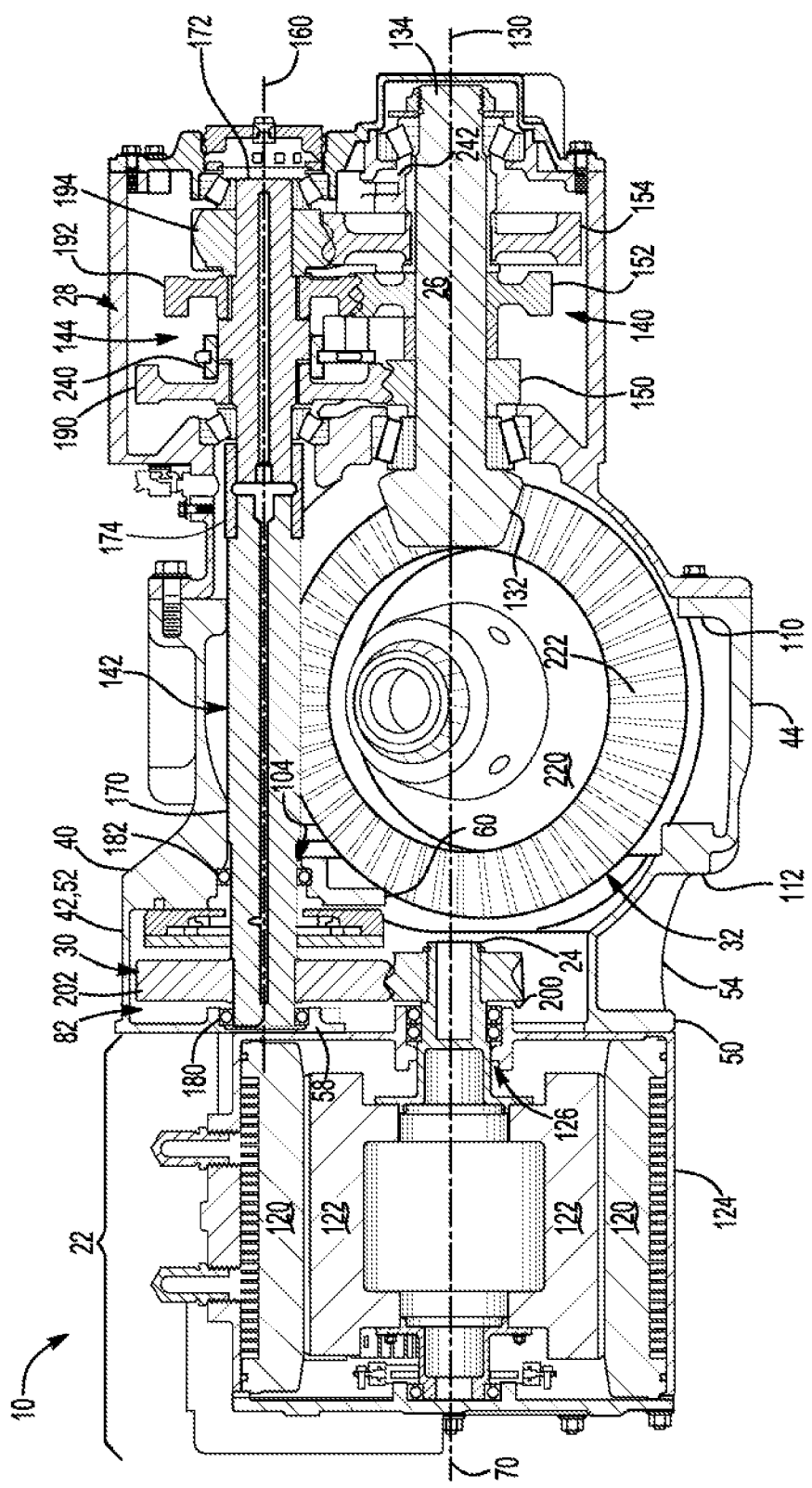
FIG. 2 is a section view along section line 2-2.

The axle assembly 10 may provide torque to one or more traction wheel assemblies that may include a tire mounted on a wheel. In at least one configuration such as is shown in FIGS. 1 and 2, the axle assembly 10 may include a housing assembly 20, an electric motor module 22, a rotor shaft 24, a drive pinion 26, a countershaft transmission module 28, a drop gear set 30, a differential assembly 32, and at least one wheel end assembly 34.

Referring to FIG. 1, the housing assembly 20 may facilitate mounting of the axle assembly 10 to the vehicle. In addition, the housing assembly 20 may receive various components of the axle assembly 10. For example, the housing assembly 20 may receive and support the electric motor module 22, the rotor shaft 24, the drive pinion 26, the countershaft transmission module 28, the drop gear set 30, the differential assembly 32, or combinations thereof. In at least one configuration, the housing assembly 20 may include an axle housing 40 that may have a drop gear housing portion 42, a center portion 44, and one or more arm portions 46. The axle housing 40 may be made of any suitable material, such as a metal or metal alloy (e.g., steel, ductile iron).

Referring primarily to FIGS. 3-6, the drop gear housing portion 42 may be disposed at an end of the axle housing 40. The drop gear housing portion 42 may protrude from the center portion 44 and may be integrally formed with the center portion 44 such that the drop gear housing portion 42 and the center portion 44 are a single one-piece component. Such a configuration may eliminate a connection interface between the drop gear housing portion 42 and the center portion 44, such as a bolted joint, and may eliminate seals and leak paths between the drop gear housing portion 42 and the center portion 44. In at least one configuration, the drop gear housing portion 42 may include a first mounting flange 50, a connecting wall 52, a plurality of ribs 54, a ramp portion 56, a first divider wall 58, and a second divider wall 60.

Figure 5:
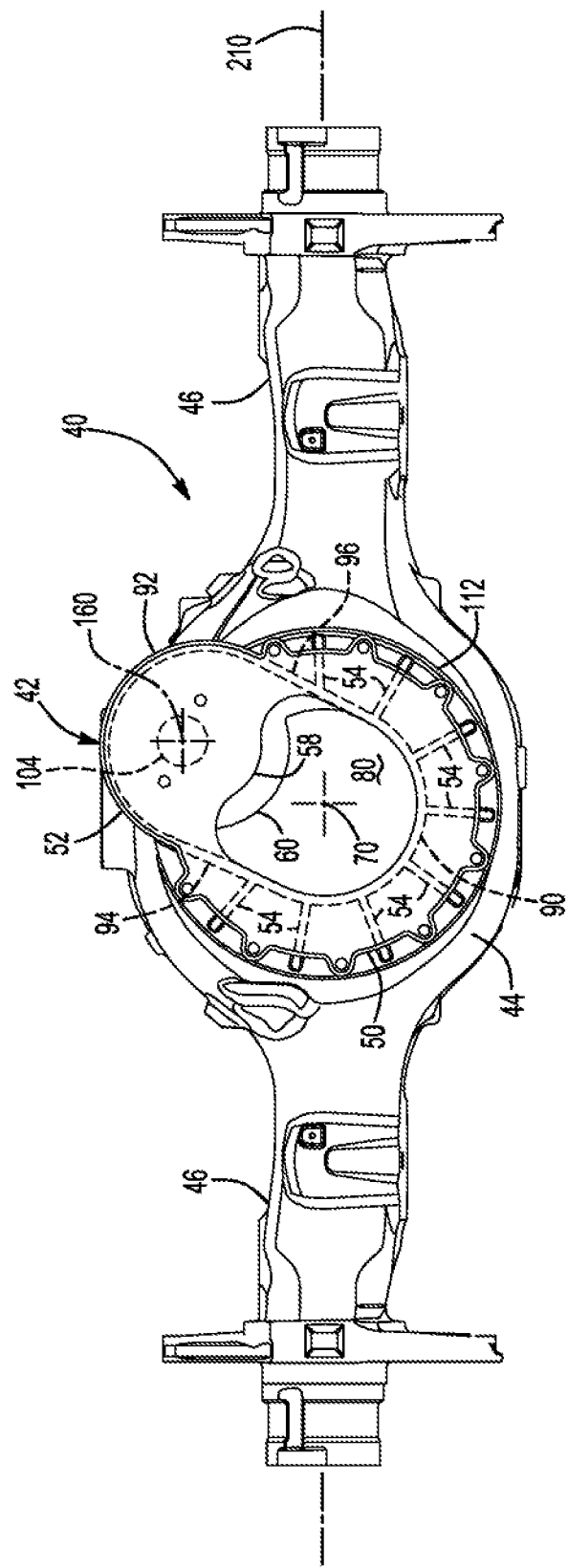
FIG. 5 is a rear side view of the axle housing with respect to the orientation shown in FIG. 1.
Figure 6:
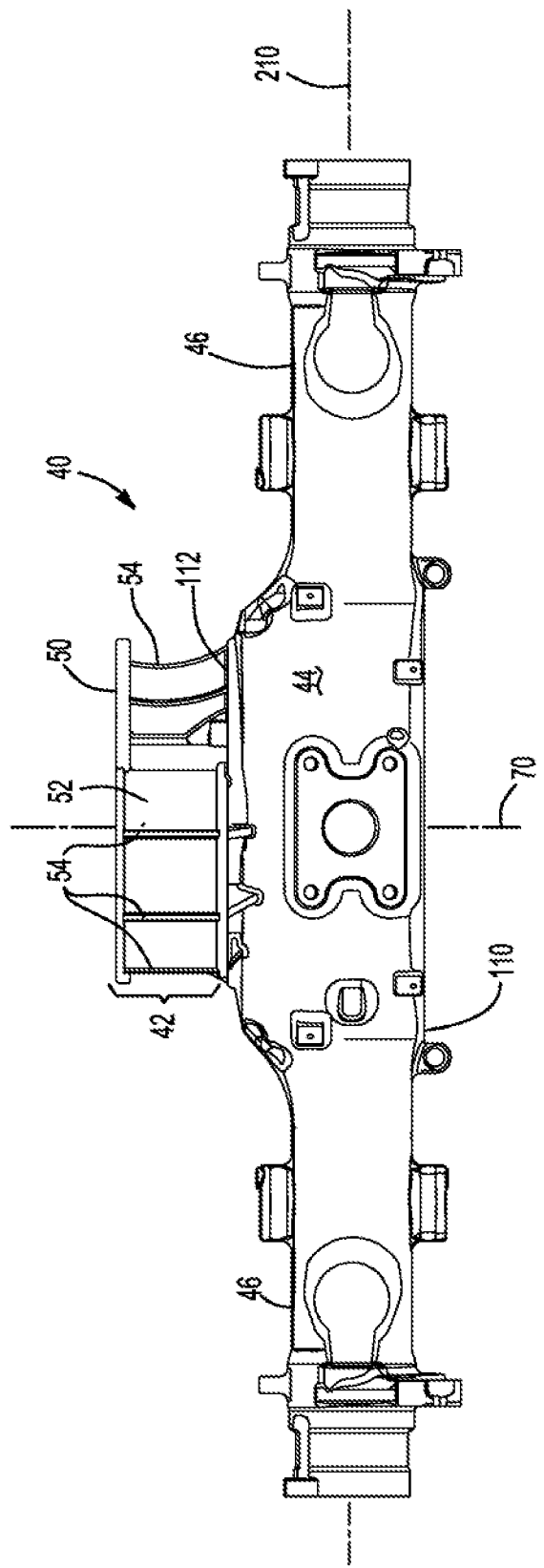
FIG. 6 is a top view of the axle housing with respect to the orientation shown in FIG. 1.

Referring primarily to FIGS. 1, 2, 5 and 6, the first mounting flange 50 may facilitate mounting of the electric motor module 22 to the axle housing 40. The first mounting flange 50 may be disposed at an end of the drop gear housing portion 42 that may be disposed opposite the center portion 44. In at least one configuration, the first mounting flange 50 may extend in an outward direction that may extend away from a first axis 70 about which a rotor of the electric motor module 22 may rotate. The first mounting flange 50 may include a plurality of holes that may receive fasteners such as bolts that may couple the electric motor module 22 to the first mounting flange 50. As is best shown in FIG. 6, the first mounting flange 50 may define a first opening 80.

Referring primarily to FIGS. 5 and 6, the connecting wall 52 may extend from the first mounting flange 50 to the center portion 44. For example, the connecting wall 52 may extend from the first mounting flange 50 to an end wall of the center portion 44 as will be discussed in more detail below. In at least one configuration, the connecting wall 52 may extend substantially parallel to the first axis 70, a countershaft axis 160, or both. These axes will be discussed in more detail below. As is best shown in FIG. 2, the connecting wall 52 may extend around a drop gear housing cavity 82 that may receive the drop gear set 30 as will be discussed in more detail below. The connecting wall 52 may be provided in various configurations. In at least one configuration such as is best shown in FIG. 5, the connecting wall 52 may have a generally oval configuration that include a first arcuate portion 90, a second arcuate portion 92, a first lateral side 94, and a second lateral side 96.

The first arcuate portion 90 may extend along a curve or an arc from the first lateral side 94 to the second lateral side 96. In at least one configuration, the first arcuate portion 90 may be radially disposed with respect to an axis, such as the first axis 70.

The second arcuate portion 92 may be disposed opposite the first arcuate portion 90. The second arcuate portion 92 may extend along a curve or an arc from the first lateral side 94 to the second lateral side 96. In at least one configuration, the second arcuate portion 92 may be radially disposed with respect to an axis, such as the countershaft axis 160.

The first lateral side 94 may extend from a first end of the first arcuate portion 90 to a first end of the second arcuate portion 92. In at least one configuration, the first lateral side 94 may have a generally straight or linear configuration.

The second lateral side 96 may be disposed opposite the first lateral side 94. The second lateral side 96 may extend from a second end of the first arcuate portion 90 to a second end of the second arcuate portion 92. The second lateral side 96 may have a generally straight or linear configuration. In at least one configuration, the first lateral side 94 may be disposed parallel or substantially parallel to the second lateral side 96.

Referring to FIGS. 5 and 6, a plurality of ribs 54 may be arranged around the drop gear housing portion 42. The ribs 54 may help reinforce the housing assembly 20 to inhibit or reduce bending or flexing of the drop gear housing portion 42, such as when the electric motor module 22 is mounted to the drop gear housing portion 42. In at least one configuration, a rib 54 may be substantially flat and may extend in a generally linear or planar manner. Each rib 54 may extend from the first mounting flange 50 to an end wall of the center portion 44. In addition, each rib 54 may extend outwardly from the connecting wall 52 or in a direction that may extend away from the inside of the drop gear housing portion 42.

Figure 3:
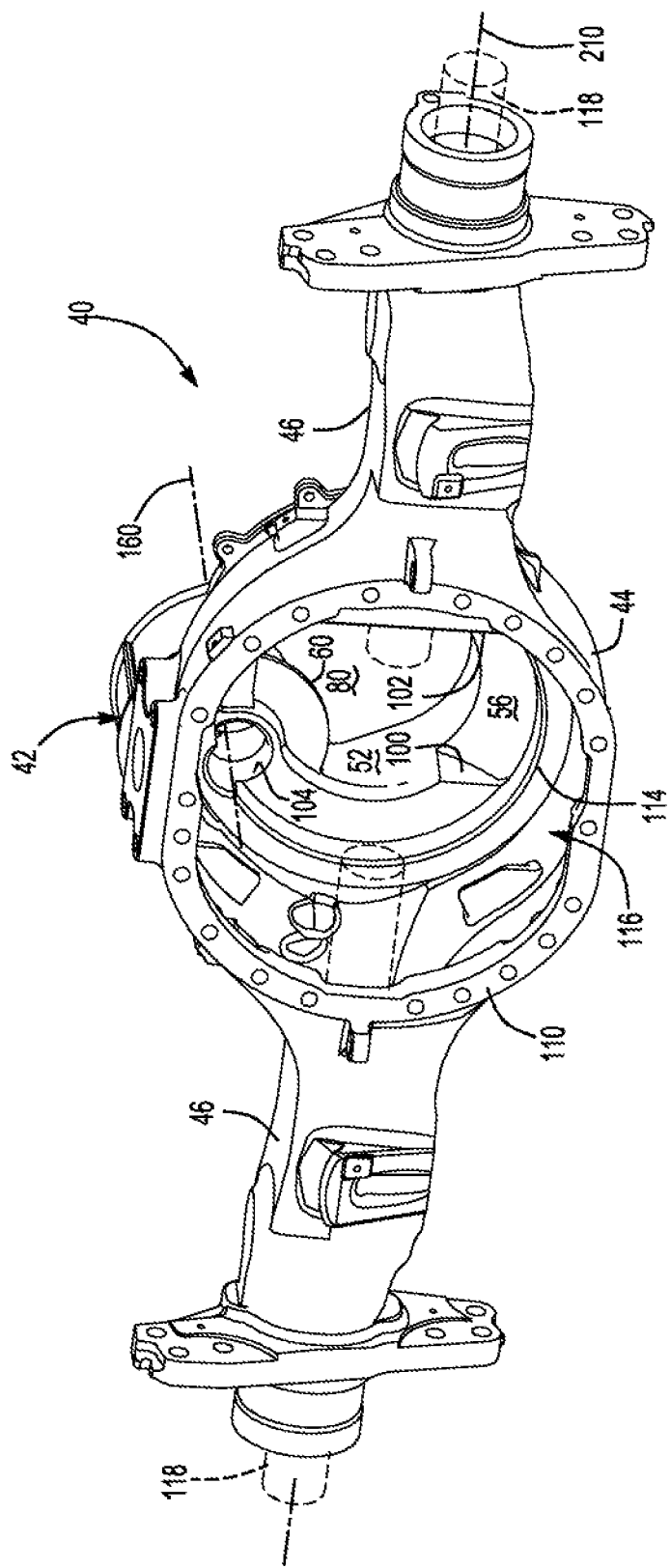
FIG. 3 is a perspective view of an axle housing of the axle assembly.
Figure 4:
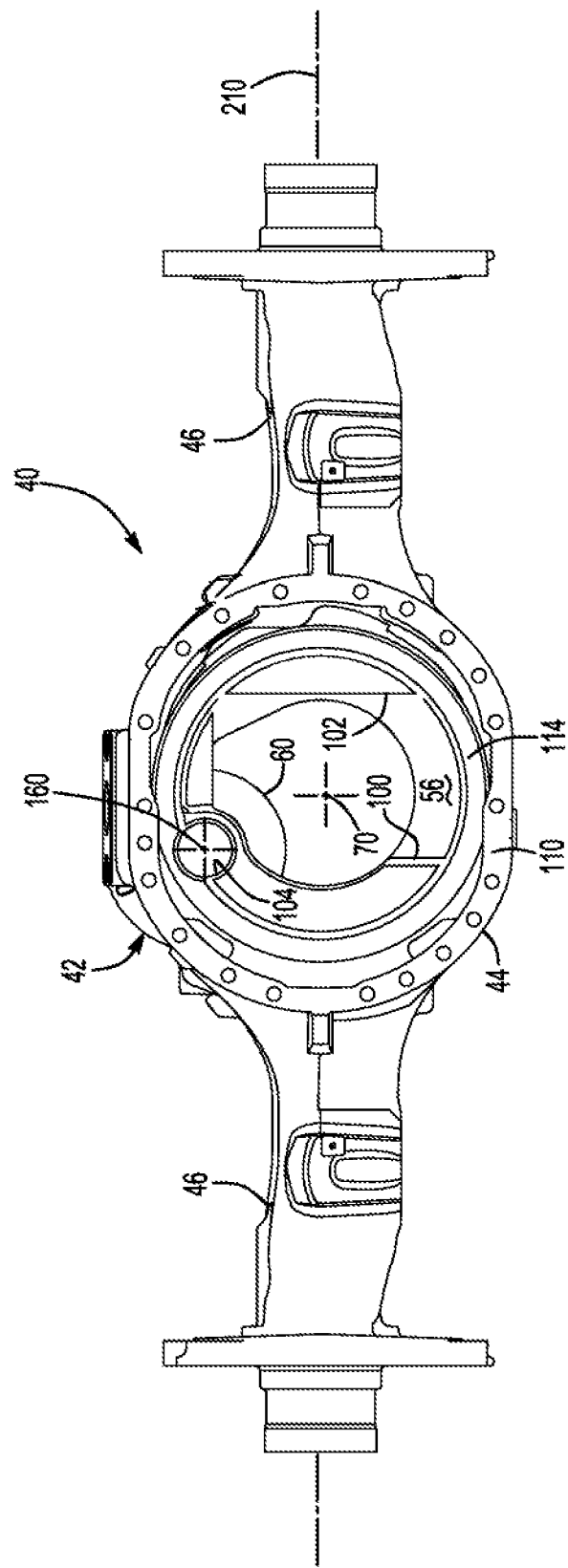
FIG. 4 is a front side view of the axle housing with respect to the orientation shown in FIG. 1.

Referring to FIGS. 3 and 4, the ramp portion 56 may be disposed below the first axis 70. The ramp portion 56 may extend in an axial direction from the connecting wall 52 toward the center portion 44. In addition, the ramp portion 56 may extend in a downward direction from the connecting wall 52 toward the center portion 44 and may facilitate lubricant flow from the drop gear housing portion 42 to the center portion 44. In at least one configuration, the ramp portion 56 may be bounded in a lateral direction by a first ramp side wall 100 and a second ramp side wall 102. The first ramp side wall 100 and the second ramp side wall 102 may be disposed on opposite sides of the first axis 70. In addition, the first ramp side wall 1 may be disposed parallel or substantially parallel to the second ramp side wall 102.

Referring to FIG. 5, the first divider wall 58 may be disposed proximate an end of the drop gear housing portion 42 and the first mounting flange 50. For example, first divider wall 58 may extend from the connecting wall 52 toward or into the first opening 80. In addition, the first divider wall 58 may be coplanar with the first mounting flange 50 and may extend downward from the second arcuate portion 92.

Referring to FIGS. 3-5, the second divider wall 60 may be disposed inside the drop gear housing portion 42 of the axle housing 40. The second divider wall 60 may extend from an interior surface of the connecting wall 52. For example, the second divider wall 60 may extend downward from the second arcuate portion 92. The second divider wall 60 may define a hole 104 that may extend around the countershaft axis 160. The hole 104 may receive a first countershaft that may extend from the drop gear set 30 as will be discussed in more detail below. As is best shown in FIG. 2, the drop gear set 30 may be axially positioned in the drop gear housing portion 42 between the first divider wall 58 and the second divider wall 60.

Referring to FIGS. 1 and 2, the center portion 44 may be disposed proximate the center of the housing assembly 20. The center portion 44 may extend from the drop gear housing portion 42 and may at least partially define a cavity that may receive the differential assembly 32. The center portion 44 may facilitate mounting of a differential carrier that supports the differential assembly 32. A lower region of the center portion 44 may at least partially define a sump portion that may contain lubricant that may be splashed to lubricate internal components of the axle assembly 10, such as the differential assembly 32 and associated bearings. The center portion 44 may also facilitate mounting of various external components. For instance, the center portion 44 may facilitate mounting of the electric motor module 22 and the countershaft transmission module 28 to the housing assembly 20. In at least one configuration and as is best shown with reference to FIGS. 3-6, the center portion 44 may define a second mounting flange 110 and may include an end wall 112 and a ring 114.

Referring to FIGS. 2-4, the second mounting flange 110 may be disposed opposite the first mounting flange 50. The second mounting flange 110 may facilitate mounting of the countershaft transmission module 28, the differential assembly 32, or both to the axle housing 40. The second mounting flange 110 may be disposed at an end or side of the center portion 44 that may be disposed opposite the drop gear housing portion 42. In at least one configuration, the second mounting flange 110 may extend continuously around the first axis 70. The second mounting flange 110 may include a plurality of holes that may receive fasteners such as bolts that may couple a portion of the housing assembly 20 that may support the countershaft transmission module 28, the differential assembly 32, or both to the second mounting flange 110. For instance, the differential carrier may be mounted to the second mounting flange 110. As is best shown in FIG. 3, the second mounting flange 110 may define a second opening 116.

Referring primarily to FIGS. 5 and 6, the end wall 112 may be disposed opposite the second mounting flange 110. The drop gear housing portion 42 may extend from the end wall 112. For example, the connecting wall 52 may extend from the end wall 112 and the end wall 112 may extend outward from an end of the connecting wall 52 toward the arm portions 46. In at least one configuration, the end wall 112 may be disposed parallel or substantially parallel to the first mounting flange 50, the second mounting flange 110, or both.

Referring to FIGS. 3 and 4, the ring 114 may be disposed inside the center portion 44. The ring 114 may extend around the first axis 70 and may extend from the end wall 112 toward the second mounting flange 110. The ramp portion 56 may extend from the connecting wall 52 to the ring 114.

Referring to FIGS. 3-6, one or more arm portions 46 may extend from the center portion 44. For example, two arm portions 46 may extend in opposite directions from the center portion 44 and away from the differential assembly 32. The arm portions 46 may have substantially similar configurations. For example, the arm portions 46 may each have a hollow configuration or tubular configuration that may extend around a corresponding axle shaft 118, which is shown in phantom in FIG. 3, and may help separate or isolate the axle shaft 118 from the surrounding environment. An arm portion 46 or a portion thereof may be integrally formed with the center portion 44. Alternatively, an arm portion 46 may be separate from the center portion 44. In such a configuration, each arm portion 46 may be attached to the center portion 44 in any suitable manner, such as by welding or with one or more fasteners. It is also contemplated that the arm portions 46 may be omitted.

Referring to FIGS. 1 and 2, the electric motor module 22 may provide torque to the differential assembly 32 via the rotor shaft 24, the drop gear set 30, the countershaft transmission module 28, and the drive pinion 26. In addition, the electric motor module 22 may be electrically connected to an electrical power source, such as a battery, capacitor, or the like. An inverter may electrically connect the electric motor module 22 and the electrical power source. The electric motor module 22 may have any suitable configuration. In at least one configuration, the electric motor module 22 may include an electric motor that has a stator 120 and a rotor 122. In addition, the electric motor module 22 may have an electric motor housing 124.

Referring to FIG. 2, the stator 120 may be fixedly positioned with respect to the housing assembly 20 and the electric motor housing 124. For example, the stator 120 may extend around a first axis 70 and may not rotate about the first axis 70. The stator 120 may include windings that may be electrically connected to the electrical power source.

The rotor 122 may extend around the first axis 70 and may be received inside the stator 120. The rotor 122 may be rotatable about the first axis 70 with respect to the stator 120. For example, the rotor 122 may be spaced apart from the stator 120 and may include magnets or ferromagnetic material that may facilitate the generation of electrical current. The rotor 122 may be operatively connected to the countershaft transmission module 28 via the rotor shaft 24 and the drop gear set 30 as will be discussed in more detail below.

The electric motor housing 124 may receive the stator 120 and the rotor 122. The electric motor housing 124 may be mounted to the first mounting flange 50. For instance, the electric motor housing 124 may contact the first mounting flange 50 and may be secured to the first mounting flange 50 with one or more fasteners. The electric motor housing 124 may include an opening 126 through which the rotor shaft 24 may extend.

The rotor shaft 24 may operatively connect the electric motor module 22 to the drop gear set 30. For example, the rotor shaft 24 may extend from the rotor 122 or may be operatively connected to the rotor 122 such that the rotor 122 and the rotor shaft 24 may be rotatable together about the first axis 70. The rotor shaft 24 may be fixedly coupled to the rotor 122 at or proximate a first end of the rotor shaft 24 and may be fixedly coupled to a gear of the drop gear set 30 proximate a second end that may be disposed opposite the first end. The rotor shaft 24 may extend through the opening 126 in the electric motor housing 124 and into the first opening 80 of the drop gear housing portion 42. The rotor shaft 24 may be rotatably supported on the housing assembly 20 by one or more roller bearing assemblies. In the configuration shown in FIG. 2, a pair of roller bearing assemblies are disposed in the opening 126 and may extend from the electric motor housing 124 to the rotor shaft 24. The roller bearing assemblies may be positioned along the first axis 70 between the rotor 122 and a first drop gear of the drop gear set 30. The roller bearing assembly may have any suitable configuration. For instance, the roller bearing assembly may include a plurality of rolling elements that may be disposed between an inner race and an outer race. The inner race may be mounted to the rotor shaft 24 and may extend around and may receive the rotor shaft 24. The outer race may extend around the inner race and may be mounted to the electric motor housing 124.

The drive pinion 26 may be at least partially received in the housing assembly 20. The drive pinion 26 may be operatively connectable to the electric motor module 22 via the rotor shaft 24, the drop gear set 30, and the countershaft transmission module 28. As such, the drive pinion 26 may help operatively connect the electric motor module 22 to components of the axle assembly 10 like the differential assembly 32. The drive pinion 26 may extend along and may be rotatable about a drive pinion axis 130. The drive pinion axis 130 may be disposed parallel or substantially parallel to the first axis 70. In at least one configuration, the drive pinion axis 130 may be coaxially disposed with the first axis 70. In at least one configuration, the drive pinion 26 may include a gear portion 132 and a shaft portion 134.

The gear portion 132 may be disposed at or near an end of the drive pinion 26. The gear portion 132 may have a plurality of teeth that may mate or mesh with corresponding teeth on a ring gear of the differential assembly 32 as will be discussed in more detail below. As such, the drive pinion 26 may provide torque from the electric motor module 22 to the ring gear.

The shaft portion 134 may extend along and may be rotatable about the drive pinion axis 130 with the gear portion 132. The shaft portion 134 may be operatively connected to the countershaft transmission module 28 and may extend from the gear portion 132 in a direction that may extend away from the electric motor module 22. The shaft portion 134 may be integrally formed with the gear portion 132 or may be provided as a separate component that may be fixedly coupled to the gear portion 132.

The countershaft transmission module 28 may operatively connect the electric motor module 22 to the drive pinion 26. The countershaft transmission module 28 may be spaced apart from the electric motor module 22 such that the differential assembly 32 may be positioned between the countershaft transmission module 28 and the electric motor module 22. For instance, the differential assembly 32 may be positioned between the drop gear set 30 and the drive pinion 26 or between the drop gear set 30 and the countershaft transmission module 28. In at least one configuration, the countershaft transmission module 28 may include a set of drive pinion gears 140, a countershaft subassembly 142, and a set of countershaft gears 144.

The set of drive pinion gears 140 may include a plurality of gears. In the configuration shown, the set of drive pinion gears 140 includes a first gear 150, a second gear 152, and a third gear 154; however, it is to be understood that a greater or lesser number of gears may be provided. The members of the set of drive pinion gears 140 may be selectively coupled to the drive pinion 26, fixedly coupled to the drive pinion 26, or at least one drive pinion gear may be selectively coupled to the drive pinion 26 and at least one drive pinion gear may be fixedly coupled to the drive pinion 26. A member of the set of drive pinion gears 140 may be rotatable about the drive pinion axis 130 with the drive pinion 26 when that gear is coupled to the drive pinion 26. Conversely, the drive pinion 26 may be rotatable about the drive pinion axis 130 with respect to a member of the set of drive pinion gears 140 that is decoupled from or not coupled to the drive pinion 26. A member of the set of drive pinion gears 140 may be selectively coupled to the drive pinion 26 in any suitable manner, such as with a clutch as will be discussed in more detail below.

Referring to FIG. 2, the first gear 150 may receive the shaft portion 134 of the drive pinion 26. For example, the first gear 150 may have a through hole through which the shaft portion 134 may extend. The first gear 150 may extend around the drive pinion axis 130 and the shaft portion 134 and may have a plurality of teeth that may be arranged around and may face away from the drive pinion axis 130. The teeth of the first gear 150 may contact and may mate or mesh with teeth of a first countershaft gear that may be provided with the set of countershaft gears 144 as will be discussed in more detail below. In at least one configuration, the first gear 150 may be axially positioned along the drive pinion axis 130 such that the first gear 150 is positioned closer to the electric motor module 22 and the differential assembly 32 than some or all of the other members of the set of drive pinion gears 140.

The second gear 152 may receive the shaft portion 134 of the drive pinion 26. For example, the second gear 152 may have a through hole through which the shaft portion 134 may extend. The second gear 152 may extend around the drive pinion axis 130 and the shaft portion 134 and may have a plurality of teeth that may be arranged around and may face away from the drive pinion axis 130. The teeth of the second gear 152 may contact and may mate or mesh with teeth of a second countershaft gear that may be provided with the set of countershaft gears 144 as will be discussed in more detail below. The second gear 152 may have a different diameter than the first gear 150 and the third gear 154. For example, the second gear 152 may have a larger diameter than the first gear 150 and a smaller diameter than the third gear 154. In at least one configuration, the second gear 152 may be axially positioned along the drive pinion axis 130 between the first gear 150 and the third gear 154.

The third gear 154 may receive the shaft portion 134 of the drive pinion 26. For example, the third gear 154 may have a through hole through which the shaft portion 134 may extend. The third gear 154 may extend around the drive pinion axis 130 and the shaft portion 134 and may have a plurality of teeth that may be arranged around and may face away from the drive pinion axis 130. The teeth of the third gear 154 may contact and may mate or mesh with teeth of a third countershaft gear that may be provided with the set of countershaft gears 144 as will be discussed in more detail below. The third gear 154 may have a different diameter than the first gear 150 and the second gear 152. For example, the third gear 154 may have a larger diameter than the first gear 150 and the second gear 152. In at least one configuration, the third gear 154 be axially positioned along the drive pinion axis 130 further from the electric motor module 22 and the differential assembly 32 than the first gear 150 and the second gear 152.

The countershaft subassembly 142 may be rotatable about a countershaft axis 160. The countershaft axis 160 may be disposed parallel or substantially parallel to the first axis 70, the drive pinion axis 130, or both. The countershaft axis 160 may be offset from and may not be coaxially disposed with the first axis 70, the drive pinion axis 130, or both. In at least one configuration, the countershaft axis 160 may be disposed above the first axis 70. The countershaft subassembly 142 may be rotatably supported on the housing assembly 20 by one or more roller bearing assemblies. In at least one configuration, the countershaft subassembly 142 may include a first countershaft 170, a second countershaft 172, and a coupling 174.

The first countershaft 170 may be at least partially received in the axle housing 40 and may be rotatable about the countershaft axis 160. The first countershaft 170 may extend through the second opening 116 of the center portion 44. The first countershaft 170 may be rotatably supported by a first bearing 180 and a second bearing 182. The first bearing 180 may extend from the first divider wall 58 of the drop gear housing portion 42. The second bearing 182 may be disposed proximate the second divider wall 60 of the drop gear housing portion 42. The drop gear set 30 may be axially positioned between the first bearing 180 and the second bearing 182.

The second countershaft 172 may be partially or completely disposed outside of the axle housing 40. For example, the second countershaft 172 may be disposed in the housing that receives the set of drive pinion gears 140, the countershaft subassembly 142, the set of countershaft gears 144, or combinations thereof. The second countershaft 172 may support the set of countershaft gears 144. In addition, the second countershaft 172 may be rotatably supported by bearings such that the set of countershaft gears 144 may be axially positioned between the bearings.

The coupling 174 may fixedly couple the first countershaft 170 to the second countershaft 172. For example, the coupling 174 may receive an end of the first countershaft 170 and an end of the second countershaft 172. The coupling may couple the first countershaft 170 and the second countershaft 172 in any suitable manner. For instance, the coupling 174 may receive the first countershaft 170, the second countershaft 172, or both with an interference fit, may be coupled to a countershaft with mating splines, may be coupled to a countershaft with one or more fasteners, or the like.

The set of countershaft gears 144 may be at least partially received in a portion of the housing assembly 20. The set of countershaft gears 144 may include a plurality of gears. In the configurations shown, the set of countershaft gears 144 may include a first countershaft gear 190, a second countershaft gear 192, and a third countershaft gear 194; however, it is contemplated that a greater number of gears or a lesser number of countershaft gears may be provided. Members of the set of countershaft gears 144 may be selectively coupled to the countershaft subassembly 142, fixedly coupled to the countershaft subassembly 142, or at least one countershaft gear may be selectively coupled to the countershaft subassembly 142 and at least one other countershaft gear may be fixedly coupled to the countershaft subassembly 142. A member of the set of countershaft gears 144 may be rotatable about the countershaft axis 160 with the countershaft subassembly 142 when that gear is coupled to the countershaft subassembly 142. Conversely, the countershaft subassembly 142 may be rotatable about the countershaft axis 160 with respect to a member of the set of countershaft gears 144 that is decoupled from or not coupled to the countershaft subassembly 142. A member of the set of countershaft gears 144 may be selectively coupled to the countershaft subassembly 142 in any suitable manner, such as with a clutch as will be discussed in more detail below.

The first countershaft gear 190 may receive the countershaft subassembly 142. For example, the first countershaft gear 190 may have a hole that may receive the countershaft subassembly 142. The first countershaft gear 190 may extend around the countershaft axis 160 and may have a plurality of teeth that may be arranged around and may face away from the countershaft axis 160. The teeth of the first countershaft gear 190 may contact and may mate or mesh with the teeth of the first gear 150. In at least one configuration, the first countershaft gear 190 may be axially positioned along the countershaft axis 160 closer to the electric motor module 22 and the differential assembly 32 than the second countershaft gear 192 and the third countershaft gear 194.

The second countershaft gear 192 may receive the countershaft subassembly 142. For example, the second countershaft gear 192 may have a hole that may receive the countershaft subassembly 142 and may be fixedly coupled to the countershaft subassembly 142. The second countershaft gear 192 may extend around the countershaft axis 160 and may have a plurality of teeth that may be arranged around and may face away from the countershaft axis 160. The teeth of the second countershaft gear 192 may contact and may mate or mesh with the teeth of the second gear 152. The second countershaft gear 192 may have a different diameter than the first countershaft gear 190 and the third countershaft gear 194. In at least one configuration, the second countershaft gear 192 may be axially positioned along the countershaft axis 160 between the first countershaft gear 190 and the third countershaft gear 194.

The third countershaft gear 194 may receive the countershaft subassembly 142. For example, the third countershaft gear 194 may have a hole that may receive the countershaft subassembly 142 and may be fixedly coupled to the countershaft subassembly 142. The third countershaft gear 194 may extend around the countershaft axis 160 and may have a plurality of teeth that may be arranged around and may face away from the countershaft axis 160. The teeth of the third countershaft gear 194 may contact and may mate or mesh with the teeth of the third gear 154. The third countershaft gear 194 may have a different diameter than the first countershaft gear 190 and the second countershaft gear 192. In at least one configuration, the third countershaft gear 194 may be axially positioned along the countershaft axis 160 further away from the electric motor module 22 and the differential assembly 32 than the first countershaft gear 190 and the second countershaft gear 192.

A bearing, such as a roller bearing, may optionally be provided to rotatably support a corresponding gear that is not fixedly coupled to a shaft. For instance, the bearing may be received in the hole of a gear and may receive a shaft portion 134 of the drive pinion 26 or the countershaft subassembly 142.

The first gear 150 and the first countershaft gear 190 may provide a different gear ratio than the second gear 152 and the second countershaft gear 192 and may provide a different gear ratio than the third gear 154 and the third countershaft gear 194. As a non-limiting example, the first gear 150 and the first countershaft gear 190 may provide a gear ratio of 1:1 or less, the second gear 152 and the second countershaft gear 192 may provide a gear ratio from 1:1 to 2:1, and the third gear 154 and the third countershaft gear 194 may provide a gear ratio of 2:1 or more. For instance, the first countershaft gear 190 may have a larger diameter than the first gear 150, the second countershaft gear 192, and the third countershaft gear 194. The second countershaft gear 192 may have a larger diameter than the third countershaft gear 194 and a smaller diameter or the same diameter as the second gear 152. The third countershaft gear 194 may have a smaller diameter than the third gear 154.

It is also contemplated that other gear configurations may be provided. As one example, the first gear 150 may have a larger diameter than the second gear 152 and the third gear 154. As another example, gears or gear pairings may be arranged in different sequences along their respective axes. As another example, multiple meshing gear pairings or no gear pairings may provide "overdrive" gear ratios of less than 1:1. As another example, multiple meshing gear pairings may provide gear ratios of greater than 1:1. As such, gear ratios may be provided that are greater than 1:1, less than 1:1, equal (i.e., 1:1), or combinations thereof.

The teeth of the gears may be of any suitable type. As a non-limiting example, the meshing teeth of the members of the set of drive pinion gears 140 and the members of the set of countershaft gears 144 may have a helical configuration.

The drop gear set 30 may be received in the drop gear housing portion 42 of the axle housing. In addition, the drop gear set 30 may be disposed on the same side of the differential assembly 32 as the electric motor module 22. For instance, the drop gear set 30 may be positioned between the electric motor module 22 and the differential assembly 32. The drop gear set 30 may include a plurality of gears. In the configuration shown, the drop gear set 30 may include a first drop gear 200 and a second drop gear 202; however, it is contemplated that a greater number of gears may be provided. Members of the drop gear set 30 may be rotatable about different axes and may have the same diameters or different diameters. The drop gear set 30 may operatively connect the rotor 122 to the first countershaft 170. In addition, the drop gear set 30 may be positioned between the first mounting flange 50 and the second mounting flange 110.

The first drop gear 200 may be fixedly disposed on the rotor shaft 24 or fixedly mounted to the rotor shaft 24. As such, the first drop gear 200 may rotate about the first axis 70 with the rotor shaft 24. For example, the first drop gear 200 may have a hole that may receive the rotor shaft 24 and may be fixedly coupled to the rotor shaft 24. The first drop gear 200 may extend around the first axis 70 and may have a plurality of teeth that may be arranged around and may face away from the first axis 70.

The second drop gear 202 may be fixedly disposed on the countershaft subassembly 142. For example, the second drop gear 202 may be fixedly mounted to or fixedly coupled to the first countershaft 170 of the countershaft subassembly 142. As such, the second drop gear 202 may rotate about the countershaft axis 160 with the countershaft subassembly 142. For example, the second drop gear 202 may have a hole that may receive the first countershaft 170 of the countershaft subassembly 142 and may be fixedly coupled to the first countershaft 170. The second drop gear 202 may extend around the countershaft axis 160 and may have a plurality of teeth that may be arranged around and may face away from the countershaft axis 160. The teeth of the first drop gear 200 may contact and may mate or mesh with the teeth of the second drop gear 202.

The first drop gear 200 and the second drop gear 202 may provide gear reduction when provided with different diameters. For example, the first drop gear 200 may have a smaller diameter than the second drop gear 202 and may provide a gear reduction ratio greater than 1:1. As a nonlimiting example, the first drop gear 200 and the second drop gear 202 may cooperate to provide a 2:1 gear reduction ratio. Such gear reduction may decrease the rotational speed of the countershaft subassembly 142 with respect to the rotational speed of the rotor shaft 24 and may increase the torque provided from the electric motor module 22 to the countershaft transmission module 28.

The differential assembly 32 may be at least partially received in the center portion 44 of the housing assembly 20. The differential assembly 32 may transmit torque to the vehicle traction wheel assemblies and permit the traction wheel assemblies to rotate at different velocities. For example, the differential assembly 32 may be operatively connected to the axle shafts 118, which are shown in phantom in FIG. 3, and may permit the axle shafts 118 to rotate at different rotational speeds about a second axis 210. The second axis 210 may be disposed perpendicular or substantially perpendicular to the first axis 70, the drive pinion axis 130, the countershaft axis 160, or combinations thereof. Moreover, the electric motor module 22 may be positioned on an opposite side of the second axis 210 from the drive pinion 26, the countershaft transmission module 28, or both. In at least one configuration, the differential assembly 32 may include a differential case 220 and a ring gear 222.

Referring to FIG. 2, the differential case 220 may be configured to receive components of the differential assembly 32. In addition, the differential case 220 may be rotatable about the second axis 210. For example, the differential case 220 may be rotatably supported by a pair of roller bearing assemblies, which in turn may be mounted to a portion of the housing assembly 20, such as a differential carrier. The differential case 220 may at least partially define a cavity that may at least partially receive gears of the differential assembly 32. For instance, the differential case 220 may receive a first and second differential gears that may be rotatable with first and second axle shafts, respectively, and one or more pinion gears that may mesh with the first and second differential gears in a manner known by those skilled in the art.

The ring gear 222 may be fixedly disposed on the differential case 220 or fixedly mounted to the differential case 220. As such, the ring gear 222 may rotate about the second axis 210 with the differential case 220. The ring gear 222 may extend around the second axis 210 and may have a set of ring gear teeth that may contact and mate or mesh with teeth of the gear portion 132 of the drive pinion 26. As such, torque may be transmitted between the countershaft transmission module 28 and the differential assembly 32 via the meshing teeth of the drive pinion 26 and the ring gear 222.

As is best shown with reference to FIG. 1, the first axis 70 and the countershaft axis 160 may be disposed in a plane 230. The second axis 210 may be disposed at an oblique angle with respect to the plane 230.

Referring to FIG. 1, a wheel end assembly 34 may be disposed at the end of an arm portion 46 of the axle housing 40. A wheel end assembly 34 may facilitate mounting of a wheel to the axle assembly 10. For instance, the wheel end assembly 34 may include a hub 250 that may be rotatable about an axis, such as the second axis 210, and to which a wheel may be mounted.

A control system may control operation of the axle assembly 10. The control system may include one or more electronic controllers, such as a microprocessor-based controller, that may monitor and/or control operation of various components of the axle assembly 10, such as the electric motor module 22 and coupling and decoupling of the gears, such as by actuating a clutch.

A clutch may have any suitable configuration. The clutch may be configured as a disc clutch that may include friction discs that may be selectively engaged to couple a gear to a corresponding shaft. Alternatively, the clutch may be configured as a dog clutch or clutch collar that may receive, rotate with, and slide along a corresponding shaft to selectively couple and decouple one or more members of the set of drive pinion gears 140 to and from the drive pinion 26, one or more members of the set of countershaft gears 144 to and from the countershaft subassembly 142, or combinations thereof. For example, a clutch that is configured as a dog clutch or a clutch collar may have a through hole that may receive the shaft portion 134 of the drive pinion 26 and may rotate about the drive pinion axis 130 with the shaft portion 134, or may have a through hole that may receive the countershaft subassembly 142 and may rotate about the countershaft axis 160 with the countershaft subassembly 142. For instance, the clutch and the shaft it receives may have mating splines that inhibit rotation of the clutch with respect to the shaft while allowing the clutch to slide in an axial direction along an axis (e.g., the drive pinion axis 130 or the countershaft axis 160) with respect to the shaft to engage or disengage a gear, such as member of the set of drive pinion gears 140 or a member of the set of countershaft gears 144. Such a clutch may have a tooth or teeth that may be configured to selectively mate or mesh with corresponding teeth on a member of the set of drive pinion gears 140 or a member of the set of countershaft gears 144 to couple the gear to the drive pinion 26 or the countershaft subassembly 142, respectively, such that the gear is rotatable about the drive pinion axis 130 with the drive pinion 26 or is rotatable about the countershaft axis 160 with the countershaft subassembly 142. The tooth or teeth of the clutch may be configured as a face gear that may be disposed along a lateral side of the clutch or may be configured like a spline and may be received inside a hole of a member of the set of drive pinion gears 140 or a member of the set of countershaft gears 144. Clutches will primarily be described below as having a dog clutch or clutch collar configuration; however, it is to be understood that a clutch may have a different configuration and may not be configured as a dog clutch or a clutch collar, that a different number of clutches may be provided, and that clutches may be associated with a single member of the set of drive pinion gears 140 or a single member of the set of countershaft gears 144 rather than multiple gears or vice versa.

Referring to FIG. 2, in at least one configuration a first clutch 240 and a second clutch 242 may be provided. In FIG. 2, the first clutch 240 may be axially positioned along the countershaft axis 160 between the first countershaft gear 190 and the second countershaft gear 192 while the second clutch 242 may be axially positioned along the between the second gear 152 and the third gear 154; however, it is contemplated that the first clutch 240 may be axially positioned along the countershaft axis 160 between the first gear 150 and the second gear 152, the second clutch 242 may be axially positioned between the second countershaft gear 192 and the third countershaft gear 194, or combinations thereof. It is also contemplated that a single actuator may be provided to actuate multiple clutches, like the first clutch 240 and the second clutch 242, that different actuators may actuate different clutches, or that a single clutch may be provided to couple and decouple the members of the set of drive pinion gears 140 to and from the drive pinion 26 or to couple and decouple members of the set of countershaft gears 144 to and from the countershaft subassembly 142.

Torque may be transmitted between the drive pinion 26 and the countershaft subassembly 142 via the first gear 150 and the first countershaft gear 190 when the first gear 150 is coupled to the drive pinion 26 and the first countershaft gear 190 is coupled to the countershaft subassembly 142. Torque may be transmitted between the drive pinion 26 and the countershaft subassembly 142 via the second gear 152 and the second countershaft gear 192 when the second gear 152 is coupled to the drive pinion 26 and the second countershaft gear 192 is coupled to the countershaft subassembly 142. Torque may be transmitted between the drive pinion 26 and the countershaft subassembly 142 via the third gear 154 and third countershaft gear 194 when the third gear 154 is coupled to the drive pinion 26 and the third countershaft gear 194 is coupled to the countershaft subassembly 142.

Shifting of a clutch may be executed when the rotational speed of a clutch and a corresponding gear are sufficiently synchronized. Sufficient synchronization may be attained using a gear synchronizer, by controlling the rotational speed of the rotor 122, or combinations thereof. Such synchronization components or control actions may be omitted with different clutch configurations, such as a clutch that is a disc clutch.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    an axle housing that includes:
        a drop gear housing portion that defines a first mounting flange;
        a center portion that extends from the drop gear housing portion and defines a second mounting flange; and
        an arm portion that extends from the center portion and is configured to receive an axle shaft;
    an electric motor module that is mounted to the first mounting flange; and
    a countershaft transmission module that is mounted to the second mounting flange.

2. The axle assembly of claim 1 wherein the drop gear housing portion is integrally formed with the center portion.

3. The axle assembly of claim 1 wherein ribs are arranged around the drop gear housing portion and extend from the center portion to the first mounting flange.

4. The axle assembly of claim 1 wherein the drop gear housing portion includes a connecting wall that extends from the first mounting flange to an end wall of the center portion, wherein the first mounting flange is disposed substantially parallel to the end wall.

5. The axle assembly of claim 4 wherein the connecting wall has a first arcuate portion that is radially disposed with respect to a first axis and a second arcuate portion that is radially disposed with respect to a countershaft axis that is disposed substantially parallel to the first axis.

6. The axle assembly of claim 5 wherein the drop gear housing portion has a first divider wall that extends from the first arcuate portion and defines a hole that extends around the countershaft axis and receives a first countershaft that extends from a drop gear set that is received in the drop gear housing portion.

7. The axle assembly of claim 6 wherein the first countershaft is rotatably supported by a first bearing that extends from the first divider wall and a second bearing that is disposed proximate a second divider wall that is spaced apart from the first divider wall such that the drop gear set is axially positioned between the first divider wall and the second divider wall.

8. The axle assembly of claim 6 wherein a ring is disposed inside the center portion that extends around the first axis and extends from the end wall toward the second mounting flange.

9. The axle assembly of claim 8 wherein the drop gear housing portion has a ramp portion that is disposed below the first axis, extends from a first ramp side wall to a second ramp side wall that is disposed substantially parallel to the first ramp side wall, and extends axially from the connecting wall to the ring to facilitate lubricant flow from the drop gear housing portion to the center portion.

10. An axle assembly comprising:
    an axle housing that at least partially receives a differential assembly, the axle housing having a first mounting flange and a second mounting flange that is disposed opposite the first mounting flange;
    an electric motor module that is mounted to the first mounting flange and that has a rotor that is rotatable about a first axis;
    a countershaft transmission module that is mounted to the second mounting flange, the countershaft transmission module having a countershaft subassembly that is partially received in the axle housing and is rotatable about a countershaft axis and a set of countershaft gears that is operatively connectable to the countershaft subassembly;
    a drop gear set that is received in the axle housing and operatively connects the rotor to the countershaft subassembly; and
    a drive pinion that operatively connects the countershaft transmission module to the differential assembly.

11. The axle assembly of claim 10 wherein the drive pinion is rotatable about the first axis.

12. The axle assembly of claim 11 wherein the countershaft axis is disposed above the first axis.

13. The axle assembly of claim 10 wherein the drop gear set is positioned between the first mounting flange and the second mounting flange.

14. The axle assembly of claim 10 wherein the first mounting flange at least partially defines a first opening and the second mounting flange defines a second opening.

15. The axle assembly of claim 14 wherein a rotor shaft extends through the first opening and operatively connects the rotor to the drop gear set.

16. The axle assembly of claim 15 wherein the countershaft subassembly includes a first countershaft that is received in the axle housing and the drop gear set includes a first drop gear that is fixedly coupled to the rotor shaft and a second drop gear that is fixedly coupled to the first countershaft.

17. The axle assembly of claim 16 wherein the electric motor module includes an electric motor housing that contacts the first mounting flange, the rotor shaft extends through an opening in the electric motor housing and is rotatably supported by a bearing that is disposed in the opening and extends from the electric motor housing to the rotor shaft, and wherein the bearing is positioned along the first axis between the rotor and the first drop gear.

18. The axle assembly of claim 16 wherein the first countershaft extends through the second opening.

19. The axle assembly of claim 18 wherein the first countershaft is fixedly coupled to a second countershaft with a coupling that receives the first countershaft and the second countershaft, wherein the set of countershaft gears is fixedly coupled to the second countershaft.

20. The axle assembly of claim 10 wherein the differential assembly is rotatable about a second axis, the first axis and the countershaft axis are disposed in a plane, and the second axis is disposed at an oblique angle with respect to the plane.

* * * * *